US012766857B2

(12) United States Patent
Kawakita et al.

(10) Patent No.: US 12,766,857 B2
(45) Date of Patent: Oct. 20, 2026

(54) DRYING DEVICE

(71) Applicant: CANON KABUSHIKI KAISHA, Tokyo (JP)

(72) Inventors: Jun Kawakita, Chiba (JP); Hiroshi Kokubo, Tokyo (JP); Kohei Aoki, Chiba (JP); Yoshiaki Hara, Chiba (JP); Yushi Sadamitsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 18/623,223

(22) Filed: Apr. 1, 2024

(65) Prior Publication Data

US 2024/0408897 A1 Dec. 12, 2024

(30) Foreign Application Priority Data

Jun. 6, 2023 (JP) ................................ 2023-093118

(51) Int. Cl.
*B41J 11/00* (2006.01)

(52) U.S. Cl.
CPC .......... *B41J 11/0022* (2021.01); *B41J 11/007* (2013.01)

(58) Field of Classification Search
CPC .... B41J 11/002; B41J 11/0022; B41J 11/0005
USPC .......................................................... 347/102
See application file for complete search history.

(56) References Cited

U.S. PATENT DOCUMENTS

2021/0001620 A1* 1/2021 Heinze .................. F26B 21/004
2021/0146680 A1* 5/2021 Dollevoet ............... F26B 21/00
2022/0035280 A1* 2/2022 Yamada ............. G03G 15/2028
2022/0281237 A1* 9/2022 Murashima .......... B41J 11/0085

FOREIGN PATENT DOCUMENTS

JP 2018-202870 A 12/2018

* cited by examiner

*Primary Examiner* — Stephen D Meier
*Assistant Examiner* — Thomas Ray Knief
(74) *Attorney, Agent, or Firm* — Venable LLP

(57) ABSTRACT

A drying device for blowing air on a sheet on which an image is formed by discharging ink and for drying the sheet includes a conveyance belt, first and second blowing units. The first blowing unit includes a plurality of first blowout holes, and the second blowing unit disposed adjacent to downstream of the first blowing unit in a sheet conveyance direction includes a plurality of second blowout holes. When a pitch between of the plurality of the first blowout holes, a first hole and a second hole downstream of the first hole and closest to the first hole in the sheet conveyance direction is a first pitch, a second pitch between a downstreammost hole of the plurality of the first blowout holes and an upstreammost hole of the plurality of the second blowout holes in the sheet conveyance direction is not more than the first pitch.

15 Claims, 10 Drawing Sheets

| P1 (mm) | 4 | 6 | 8 | 10 | 12 | 14 |
|---|---|---|---|---|---|---|
| FLOATING UP OF SHEET | ○ | ○ | ○ | ○ | × | × |

○ : NOT FLOATING UP
× : FLOATING UP

Fig. 9

DRYING DEVICE

FIELD OF THE INVENTION AND RELATED ART

The present invention relates to a drying device for drying a sheet on which an image is formed by ink.

In an image forming system in which the image is formed by the ink, there are processes for drying the sheet and blowing air to the sheet. For example, in Japanese Patent Application Laid-Open No. 2018-202870, a drying device in which a sheet is conveyed by a belt and warm air is blown to the sheet to dry the sheet is proposed.

SUMMARY OF THE INVENTION

According to an aspect of the present invention, there is provided a drying device for blowing warm air on a sheet on which an image is formed by discharging ink and for drying the sheet, the drying device comprising: a conveyance belt configured to convey the sheet; a first blowing unit including a plurality of first blowout holes configured to blow out air toward the sheet conveyed by the conveyance belt and a first duct configured to guide the air to the first blowout holes; and a second blowing unit disposed adjacent to and downstream of the first blowing unit with respect to a sheet conveyance direction, and including a plurality of second blowout holes configured to blow out air toward the sheet conveyed by the conveyance belt and a second duct configured to guide the air to the second blowout holes, wherein when a pitch between of the plurality of the first blowout holes, a first hole and a second hole which is located downstream of the first hole in the sheet conveyance direction and of which a distance to the first hole with respect to the sheet conveyance direction is shortest is defined as a first pitch, a second pitch which is a pitch between a downstreammost hole located in the downstreammost of the plurality of the first blowout holes and an upstreammost hole located in the upstreammost of the plurality of the second blowout holes with respect to the sheet conveyance direction is equal to or less than the first pitch.

According to another aspect of the present invention, there is provided a drying device for blowing warm air on a sheet on which an image is formed by discharging ink and for drying the sheet, the drying device comprising: a conveyance belt configured to convey the sheet; a first blowing unit including a plurality of first blowout holes configured to blow out air toward the sheet conveyed by the conveyance belt and a first duct configured to guide the air to the first blowout holes; and a second blowing unit disposed adjacent to downstream of the first blowing unit with respect to a sheet conveyance direction, and including a plurality of second blowout holes configured to blow out air toward the sheet conveyed by the conveyance belt and a second duct configured to guide the air to the second blowout holes, wherein an average length of a pitch of the plurality of the first blowout holes in the sheet conveyance direction is equal to or more than a pitch between a downstreammost hole located in the downstreammost of the plurality of the first blowout holes and an upstreammost hole located in the upstreammost of the plurality of the second blowout holes with respect to the sheet conveyance direction.

Further features of the present invention will become apparent from the following description of exemplary embodiments with reference to the attached drawings.

BRIEF DESCRIPTION OF THE DRAWINGS

FIG. 9 is a table illustrating relationship between a first pitch of the blowing nozzle and floating up of the sheet according to the Embodiment.

DESCRIPTION OF THE EMBODIMENTS

The present Embodiment will be described using Figures. First, an outline configuration of an image forming system of the present Embodiment will be described using FIG. 1.

[Image Forming System]

An ink jet recording system 100 of the present Embodiment uses an ink jet recording type which ejects ink to form an image on a sheet, and is an inkjet recording apparatus of a so-called sheet-feeding type, which uses two liquids of reaction fluid and the ink to form an ink image on the sheet. The sheet can be any recording material as long as it can accept the ink, for example, a paper such as a plain paper and a thick paper, a plastic film such as a sheet for an overhead projector, a special shaped sheet such as an envelope and an index paper, cloth, etc.

Figure 1:
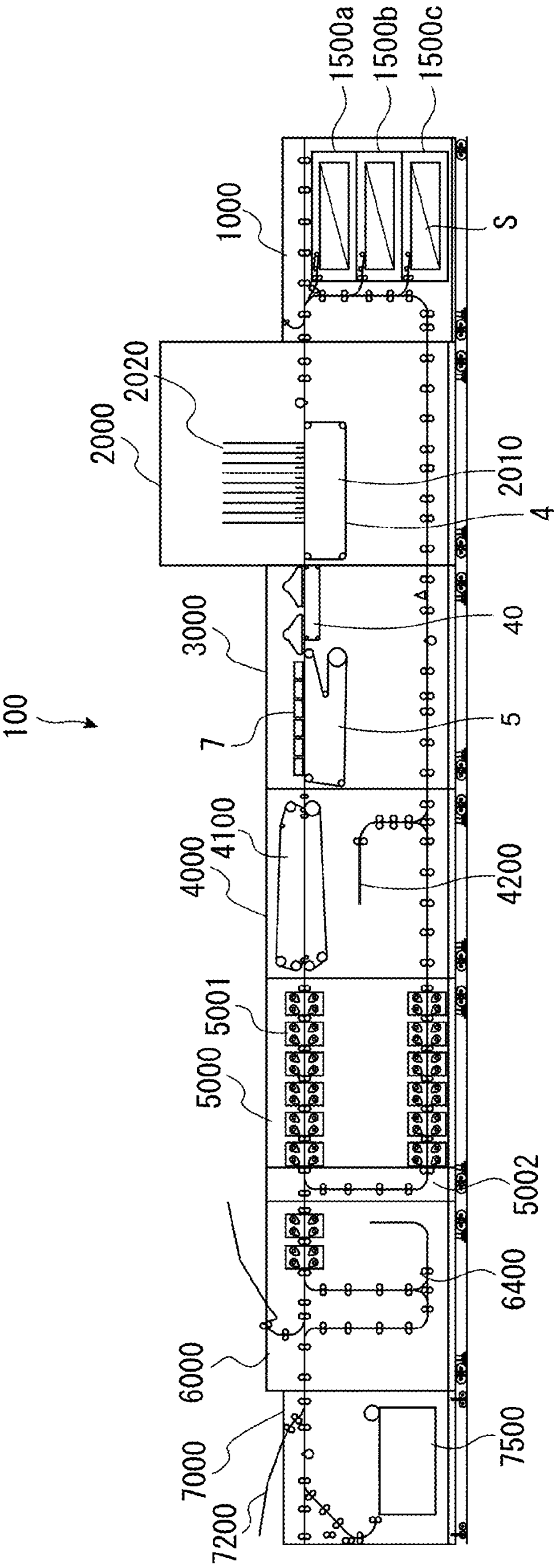
FIG. 1 is a cross-sectional view of an outline configuration illustrating an image forming system according to an Embodiment.

As shown in FIG. 1, the inkjet recording system 100 of the present Embodiment is provided with a feeding module 1000, a printing module 2000 and a drying module 3000. Furthermore, the inkjet recording system 100 is provided with a fixing module 4000, a cooling module 5000, a reversing module 6000 and a stacking module 7000. Onto a sheet S fed from the feeding module 1000, various processes are performed while being conveyed in each module along a conveyance path, and the sheet S is finally discharged to the stacking module 7000.

Incidentally, from the feeding module 1000 to the stacking module 7000, each of these modules may have a separate housing, and these housings may be connected together to constitute the inkjet recording system 100.

Alternatively, the feeding module 1000, the printing module 2000, the drying module 3000, the fixing module 4000, the cooling module 5000, the reversing module 6000 and the stacking module 7000 may be disposed in one housing.

The feeding module 1000 is provided with storages 1500*a*, 1500*b* and 1500*c* to accommodate the sheet S, and the storages 1500*a* through 1500*c* are provided to be drawable to a front side of the apparatus to accommodate the sheet S. The sheet S is fed one by one by a separating belt and a conveyance roller in each of the storages 1500*a* through 1500*c*, and is conveyed to the printing module 2000. Incidentally, the storages are not limited to the three storages 1500*a* through 1500*c*, but one, two or four or more storages may be provided.

The printing module 2000 as an image forming portion is provided with a pre image forming registration correcting portion (not shown), a print belt unit 2010 and a recording portion 2020. The sheet S conveyed from the feeding module 1000 is conveyed to the print belt unit 2010 after a tilt and a position thereof are corrected by the pre image forming registration correcting portion. With respect to the conveyance path, the recording portion 2020 is disposed in a position opposite to the print belt unit 2010. The recording portion 2020 is an inkjet recording portion which forms the image by discharging the ink onto the sheet S, which is being conveyed, from above by a recording head. A plurality of recording heads which discharge the ink are disposed in line with each other along a conveyance direction. In the present Embodiment, a total of five recording heads of line type corresponding to the four colors of Y (yellow), M (magenta), C (cyan) and Bk (black), as well as the reaction fluid are provided. The sheet S is suctioned and conveyed by the print belt unit 2010 to ensure clearance with the recording heads.

Incidentally, the number of colors of the ink and the number of the recording heads are not limited to five as described above. For an inkjet type, a type using a heat generating element, a type using a piezoelectric element, a type using an electrostatic element, a type using MEMS (Micro Electro Mechanical Systems) element, etc. can be employed. The ink of each color is supplied from an ink tank (not shown) to the recording head via an ink tube, respectively. The ink contains "0.1 weight % to 20.0 weight %" of resin component, water and water-soluble organic solvent, a coloring agent, wax, additives, etc. based on a total ink mass.

The sheet S, on which the image has been formed by the recording portion 2020, is detected by an in-line scanner (not shown), which is disposed downstream of the recording portion 2020 in the conveyance direction of the sheet S, upon being conveyed by the printing belt unit 2010. Here, misalignment and color density of the image formed on the sheet S are detected, and based on the misalignment and the color density of the image, correction of the image, the density, etc., which are to be formed on the sheet S are performed.

Figure 2:
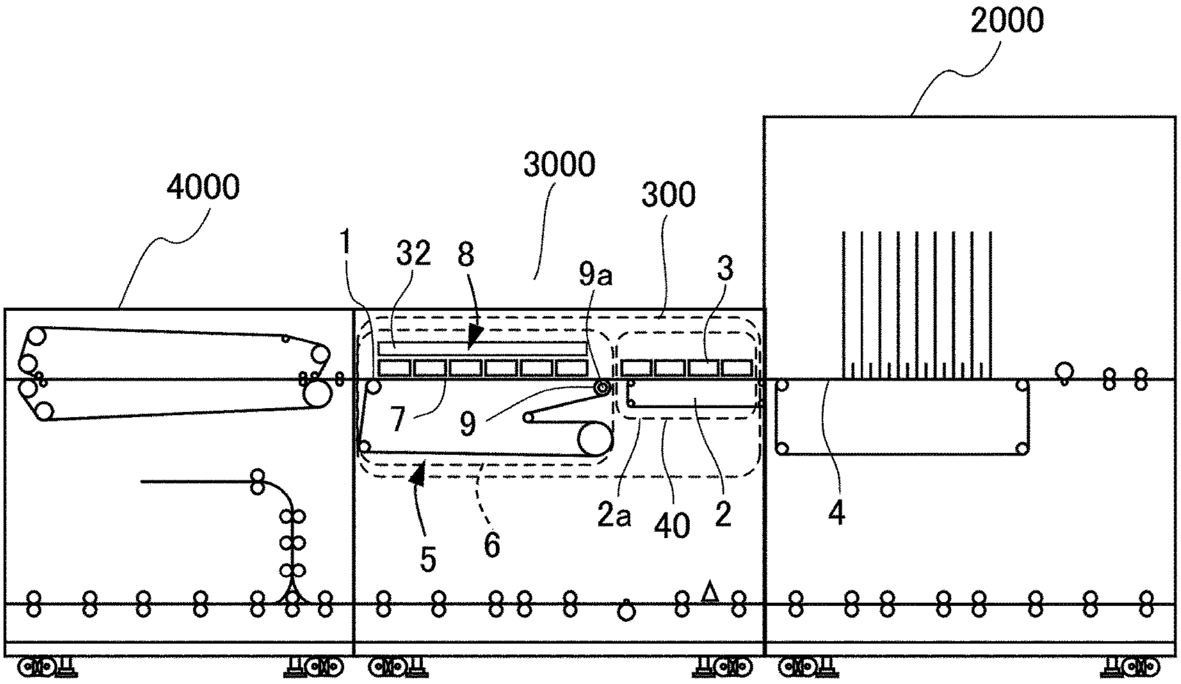
FIG. 2 is a cross-sectional view of the outline configuration illustrating a drying module, a printing module and a fixing module according to the Embodiment.

The drying module 3000 is an example of a drying device, which blows warm air onto the sheet S, on which the image has been formed by ejecting the ink, to dry the sheet S. As shown in FIG. 2, the drying module 3000 is provided with a decoupling portion 40, a drying belt unit 5 and a warm air blowing unit 8. The drying module 3000 reduces liquid content of the ink and the reaction fluid which are applied to the sheet S in order to improve fixing performance of the ink to the sheet S by the subsequent fixing module 4000. The sheet S, on which the image has been formed, is conveyed to the decoupling portion 40, which is disposed inside the drying module 3000. In the decoupling portion 40, frictional force is generated between the sheet S and a belt by wind pressure of wind blown from above, and the sheet S is conveyed by the belt. Thus, it is configured to prevent misalignment of the sheet S when the sheet S is conveyed across the printing belt unit 2010 and the decoupling portion 40 by conveying the sheet S placed on the belt with the frictional force. The sheet S conveyed from the decoupling portion 40 is suctioned and conveyed by the drying belt unit 5, and the ink and the reaction liquid applied to the sheet S is dried by the warm air blown from the warm air blowing unit 8 disposed above the belt.

By this, it becomes possible to suppress occurrence of so-called cockling, which is a phenomenon in which a line like a fringe is generated by the ink being splashed out onto the sheet S, by the ink and the reaction fluid applied to the sheet S being heated and evaporation of the liquid content thereof being promoted by the drying module 3000. Incidentally, as a heater for heating air, for example, heating by electric heating wire or infrared ray heater is preferred from a viewpoint of safety and energy efficiency. In addition, with regard to a drying type, in addition to a type imparting warm air, it may be constituted by combining a type irradiating electromagnetic waves (such as ultraviolet or infrared rays) onto a surface of the sheet S and a conduction heat transfer type with a contact of a heating element.

As shown in FIG. 1, the fixing module 4000 as a fixing system is provided with a fixing belt unit 4100 as a fixing device. The fixing belt unit 4100 fixes the ink to the sheet S by passing the sheet S, which is conveyed from the drying module 3000, through between a heated upper belt unit and a lower belt unit. As to the fixing belt unit 4100, detailed description will be given below.

The cooling module 5000 is provided with a plurality of cooling portions 5001, and the hot sheet S, which is conveyed from the fixing module 4000, is cooled by the cooling portion 5001. The cooling portion 5001 cools the sheet S, for example by sucking outside air into a cooling box with a fan to increase pressure in the cooling box and directing the air blowing from the cooling box via a nozzle due to the pressure to the sheet S. The cooling portions 5001 are disposed on both sides with respect to the conveyance path of the sheet S, and cool both sides of the sheet S.

The cooling module 5000 is provided with a conveyance path switching portion 5002. The conveyance path switching portion 5002 switches the conveyance path of the sheet S according to a case in which the sheet S is conveyed to the reversing module 6000 and a case in which the sheet S is conveyed to a double-side conveyance path for a double-side printing to form the images on both sides of the sheet S.

The reversing module 6000 is provided with a reversing portion 6400. The reversing portion 6400 reverses a front and a back of the sheet S being conveyed and changes front and back orientation of the sheet S upon being discharged to the stacking module 7000. The stacking module 7000 is provided with a top tray 7200 and a stacking portion 7500, and stacks the sheet S conveyed from the reversing module 6000.

In a case of the double-side printing, the sheet S is conveyed to a lower part of the conveyance path of the cooling module 5000 by the conveyance path switching portion 5002. The sheet S is then returned to the printing module 2000 through the double-side conveyance path of the fixing module 4000, the drying module 3000, the printing module 2000 and the feeding module 1000. In a double-side conveyance portion of the fixing module 4000, a reversing portion 4200 is provided to reverse the front and the back of the sheet S. On to the sheet S, which is returned to the printing module 2000, the image is formed by the ink also on the other side thereof, on which the image has not been formed, and is discharged to the stacking module 7000 from the drying module 3000 through the reversing module 6000.

[Drying Module]

Figure 3:
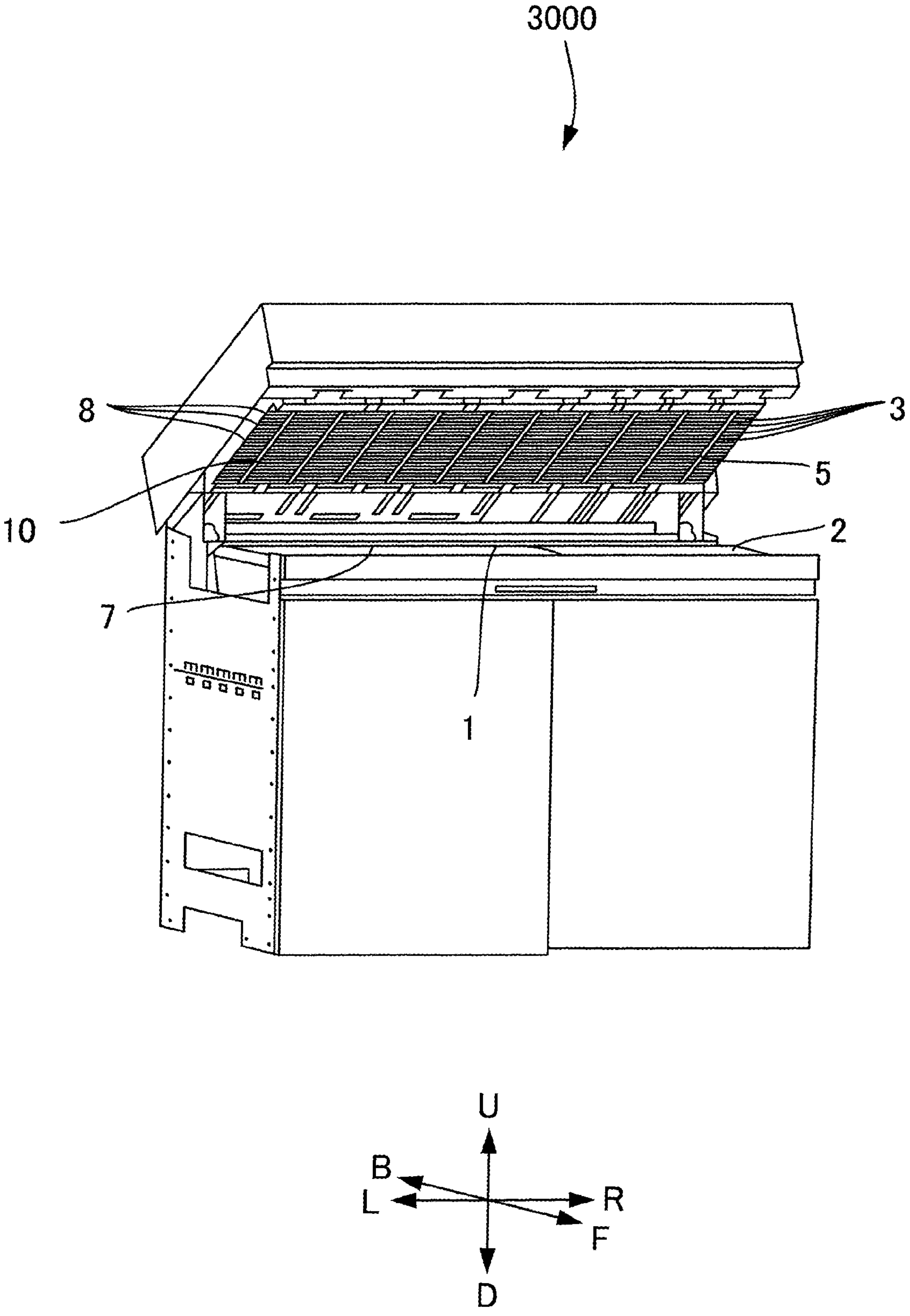
FIG. 3 is a perspective view illustrating a state in which an upper door is opened in the drying module according to the Embodiment.

Next, the drying module 3000 will be described in detail using FIG. 2 through FIG. 10. FIG. 2 is a schematic view illustrating a state in which the printing module 2000, the drying module 3000 and the fixing module 4000 are connected. FIG. 3 is a perspective view illustrating the drying module 3000. Incidentally, in FIG. 3, a near side of the inkjet recording system 100 is referred to as a front direction F, a rear side as a back direction B, a right side viewed from the near side as a right direction R, a left side viewed from the near side as a left direction L, an upside as an upper direction U, and a downside as a down direction D.

As shown in FIG. 2, the drying module 3000 is provided with the decoupling portion 40, the drying belt unit 5 and the warm air blowing unit 8. These are collectively referred to as a drying function portion 300. The drying function portion 300 is located in an upper portion of the drying module 3000 and includes a linear sheet conveyance path 1 to receive the sheet S discharged from the printing module 2000 and pass the sheet S to the fixing module 4000 after drying the sheet S. With respect to a sheet conveyance direction in this sheet conveyance path 1, in an upstream portion and in a downstream portion, the drying function portion 300 has different functions.

In the upstream portion of the drying function portion 300, the decoupling portion 40 as an air blowing device is disposed. The decoupling portion 40 is provided with a decoupling belt unit 2 as a sheet conveyance portion and a cold air blowing unit 3 as an air blowing portion. The cold air blowing unit 3 is disposed above the decoupling belt unit 2 in a vertical direction and the decoupling belt unit 2 conveys the sheet S in an approximately horizontal direction. A plurality of the cold air blowing units 3 are disposed adjacent to each other along the sheet conveyance direction. The decoupling belt unit 2 includes a rotating endless belt 2*a*. Then, by cold air (air) being blown from the cold air blowing unit 3 from an upper side of the decoupling belt unit 2, the sheet S is pressed against the belt 2*a* and conveyed. In the decoupling belt unit 2, a plurality of holes to allow air blown from the cold air blowing unit 3 to be extracted from a blowing surface to the opposite belt side are provided. Incidentally, hereinafter, the air which has not been heated by a heater, etc. is also referred to as "cold air".

When a leading end of the sheet S reaches the decoupling belt unit 2 of the drying module 3000, a trailing end side of the sheet S is still on the printing belt unit 2010 of the printing module 2000. The printing belt unit 2010 includes an endless printing belt 4 (FIG. 1) which suctions and conveys the sheet. On the print belt 4, image formation is performed onto the sheet S, and the sheet S is suctioned and conveyed on the print belt 4. In order to avoid any disturbance to this image forming process, force pressing the sheet S against the belt 2*a* is weaker than suction force of the print belt 4, and the belt 2*a* is driven at a slightly faster speed than the print belt 4. That is, the sheet S always slides against the belt 2*a* while the trailing end side of the sheet S is on the print belt 4.

On the other hand, in a moment when the trailing end of the sheet S exits an area of the print belt 4, the conveyance of the sheet S becomes dependent on the belt 2*a*. At this moment, it is necessary to control blowing force of the air of the cold air blowing unit 3 so that the sheet S does not slip due to conveyance resistance. Therefore, blown air (wind) velocity blown from the cold air blowing unit 3 onto the sheet S, which is conveyed on the belt 2*a*, is controlled to predetermined pressure using a pressure sensor (not shown) provided inside the cold air blowing unit 3 and an air intake fan (not shown) provided in an air intake portion. The cold air blowing unit 3 includes a blowing surface provided with a plurality of blowing holes, which allow for air to pass through so that pressing force can be applied to the sheet S uniformly.

[Drying Portion]

Figure 4:
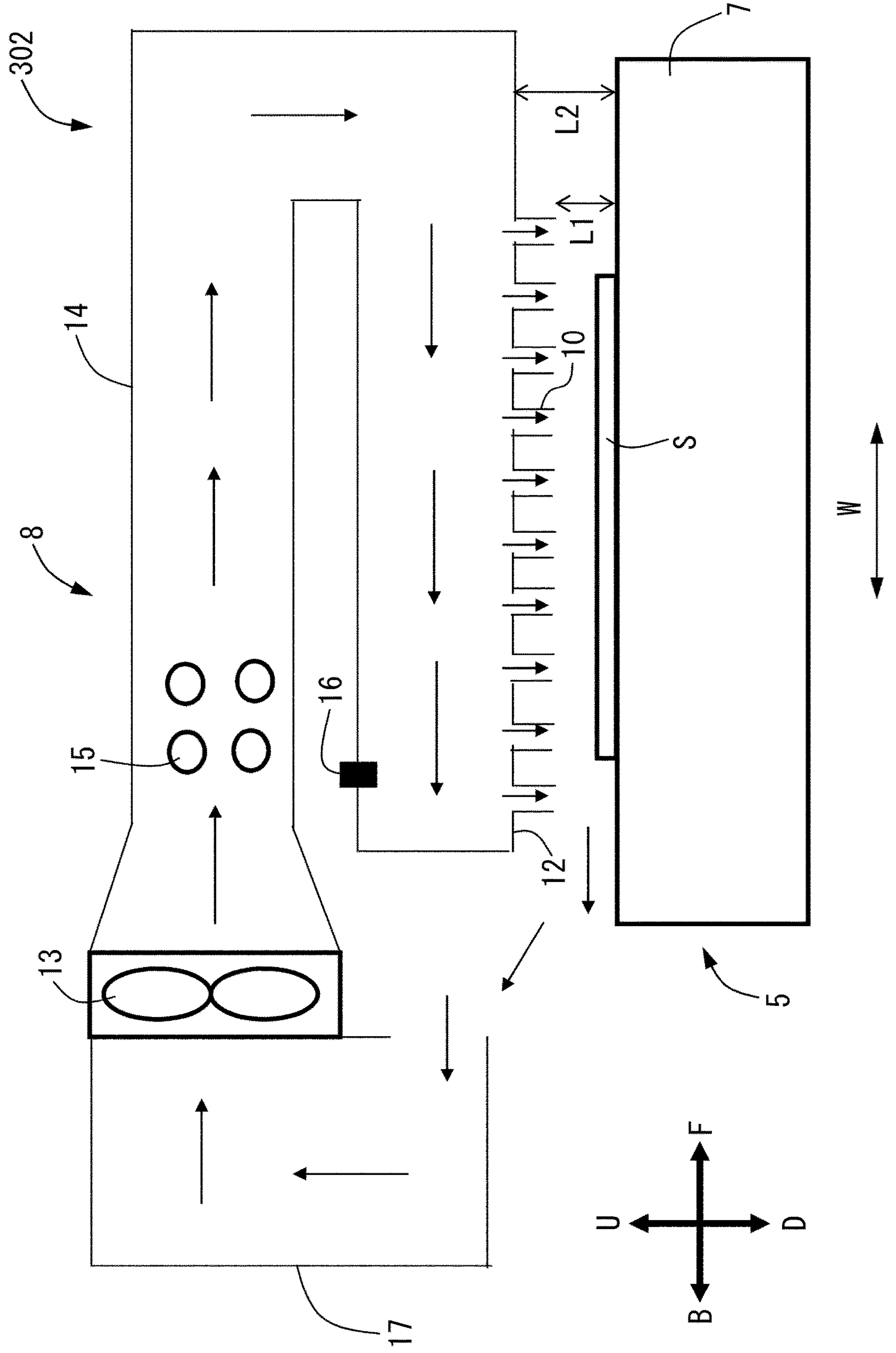
FIG. 4 is a cross-sectional view of the outline configuration illustrating a state in which a drying portion of a warm air blowing unit according to the Embodiment is viewed from a side.

Next, a drying portion 6 will be described using FIG. 2 and FIG. 4. In the downstream portion of the drying function portion 300, the drying portion 6 is disposed. The drying portion 6 includes the drying belt unit 5 and the warm air blowing unit 8. The warm air blowing unit 8 is disposed above the drying belt unit 5 in the vertical direction, and a plurality of the warm air blowing units 8 are arranged adjacent to each other along the sheet conveyance direction. The drying belt unit 5 is an example of the sheet conveyance portion and conveys the sheets S in an approximately horizontal direction.

[Warm Air Blowing Unit]

Next, the warm air blowing unit 8 will be described using FIG. 4. Arrows shown in FIG. 4 indicate flow of the air. The warm air blowing unit 8 includes a blowing fan 13, a blowing duct 14, a heater 15, a temperature sensor 16 and an air intake duct 17. In the present Embodiment, the blowing fan 13 is an axial fan. However, it is not limited to the axial fan, but other blowing sources such as a sirocco fan may be used. The heater 15 is a sheathed heater. However, it is not limited to the sheathed heater, but other heat generating sources such as a kanthal heater may be used. The intake duct 17 is connected to a suction side of the blowing fan 13.

The blowing duct 14 is provided with the heater 15 and the temperature sensor 16 inside, and an exhaust side of the blowing fan 13 is connected to an end portion of the blowing duct 14. That is, the blowing fan 13 is provided in an upstream end portion of the blowing duct 14. The heater 15 is disposed on a downstream side of a blowing path of the blowing fan 13. The heater 15 is an example of a heating portion, and is provided downstream of the blowing fan 13 in the blowing duct 14 to heat the air blown through the blowing duct 14.

A surface, which is opposite to the sheet S, further downstream of the heater 15 is a blowing surface 12, where a plurality of blowing nozzles 10 are formed. The temperature sensor 16 is mounted on an upper surface opposite to the blowing nozzles 10 in the blowing duct 14. A control portion (not shown) controls electric current to heat the heater 15 according to temperature detected by the temperature sensor 16.

[Drying Belt Unit]

Next, the drying belt unit 5 will be described using FIG. 2. The drying belt unit 5 includes a drying belt 7, which is a rotating endless conveyance belt, a plurality of stretching rollers 9 for stretching the drying belt 7, and a belt heater 9*a* for heating the drying belt 7, and the drying belt unit 5 heats and conveys the sheet with the drying belt 7. The belt heater 9*a* is a halogen heater disposed inside any one of the plurality of the stretching rollers 9 and heats the drying belt 7 via the stretching roller 9. In the present Embodiment, of the pair of the stretching rollers 9 which stretches a surface opposite to the warm air blowing unit 8, the belt heater 9*a* is disposed inside the stretching roller 9 on an upstream side of the sheet conveyance direction.

Furthermore, the drying belt unit 5 is provided with a suction box (not shown) disposed on an inner periphery side of the drying belt 7 and a suction fan (not shown) connected to the suction box. The drying belt 7 includes a plurality of suction holes through which air is drawn by the suction fan. In the suction box, a suction opening is formed on a surface opposite to the drying belt 7. Then, it is configured that, by suctioning the air via the suction box with the suction fan, the air is suctioned through the plurality of the suction holes in the drying belt 7, and the sheet S is suctioned onto a surface of the drying belt 7.

In the drying portion 6, the sheet S is dried by the warm air blowing unit 8 blowing the warm air thereto from the upper side in the vertical direction, while the sheet S is suctioned on the drying belt 7 by the drying belt unit 5 suctioning the sheet S, and the conveyance of the sheet S is performed while suppressing waving called the cockling. In order to dry the sheet S quickly, surface temperature of the drying belt 7 is adjusted to a predetermined temperature by controlling the belt heater 9*a* disposed inside the stretching roller 9 based on temperature detected by a temperature sensor (not shown) provided inside the drying belt unit 5. By this, it is configured that the sheet S conveyed by the drying belt 7 is heated.

Meanwhile, temperature of the warm air in the warm air blowing unit 8 is controlled at a predetermined temperature using the temperature sensor 16, which is provided inside the unit, and the heater 15. In addition, the blown air velocity coming out of the blowing nozzle 10 of the warm air blowing unit 8 is controlled to a predetermined pressure using a pressure sensor (not shown), which is provided inside the unit, and the suction fan. The warm air blowing unit 8 dries the ink on the sheet S with this configuration.

In order to secure the sheet S onto the drying belt 7, suction pressure on an upper surface of the drying belt 7 is adjusted to a predetermined pressure by controlling the suction fan based on pressure detected by a pressure sensor (not shown), which is provided inside the suction box. By this, the warm air blowing unit 8 blows the warm air to press the sheet S onto the drying belt 7. Incidentally, it is configured that a distance from a suction end position of the print belt 4 to a suction start position of the drying belt 7 is longer than a maximum sheet length.

[Blowing Nozzle]

Next, an outline of the blowing nozzle 10 provided in the warm air blowing unit 8 will be described using FIG. 4. As shown in FIG. 4, each of the blowing nozzles 10 has approximately cylindrical shape with a vertical direction as a center axis, and the nozzles in the conveyance direction are connected to each other by ribs 30 (see FIG. 5) of the same height as the cylinders. In addition, the blowing nozzles 10 are disposed at equal intervals in a sheet conveyance direction D1 (the left direction L) and in a sheet widthwise direction W (a front-back direction) perpendicular to the conveyance direction, respectively, so that density of the holes per unit area of the blowing surface 12 is uniform. Specifically, the cylindrical shape has a height of 5 mm, a hole diameter of 2 mm, a pitch of 14 mm with respect to the sheet conveyance direction D1 between holes, and a pitch of 14 mm with respect to the sheet widthwise direction W between holes (see FIG. 10). Incidentally, the pitch means an interval between a center of one hole and a center of another hole.

Figure 10:
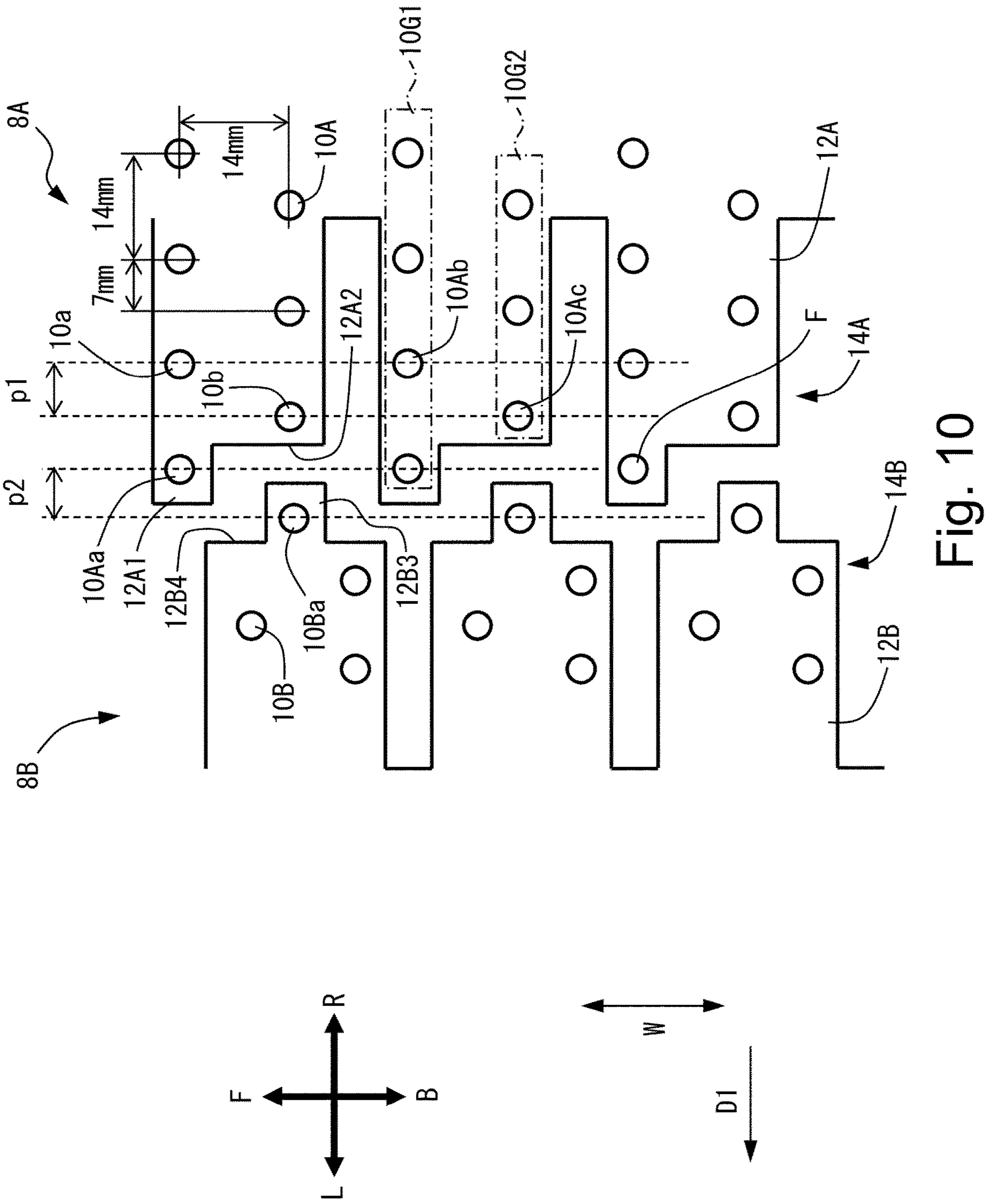
FIG. 10 is a bottom view illustrating an arrangement of the adjacent blowing nozzles of the warm air blowing unit according to the Embodiment.

Lines of the holes adjacent in the sheet widthwise direction W are disposed 7 mm apart from each other in the sheet conveyance direction D1 (see FIG. 10). In addition, a distance L1 between a tip of the blowing nozzle 10 and the drying belt 7 is 10 mm, and a distance L2 between the blowing surface 12 and the drying belt 7 is 15 mm. The blown air velocity of the blowing nozzle 10 is about 33 m/s, and a conveying speed of the sheet is 700 mm/s. With respect to the sheet widthwise direction W, the blowing nozzles 10 are provided to an area wider than the maximum size in the widthwise direction of the sheet S so that the air can be blown over an area wider than the maximum size of the sheet S to be conveyed.

Figure 5:
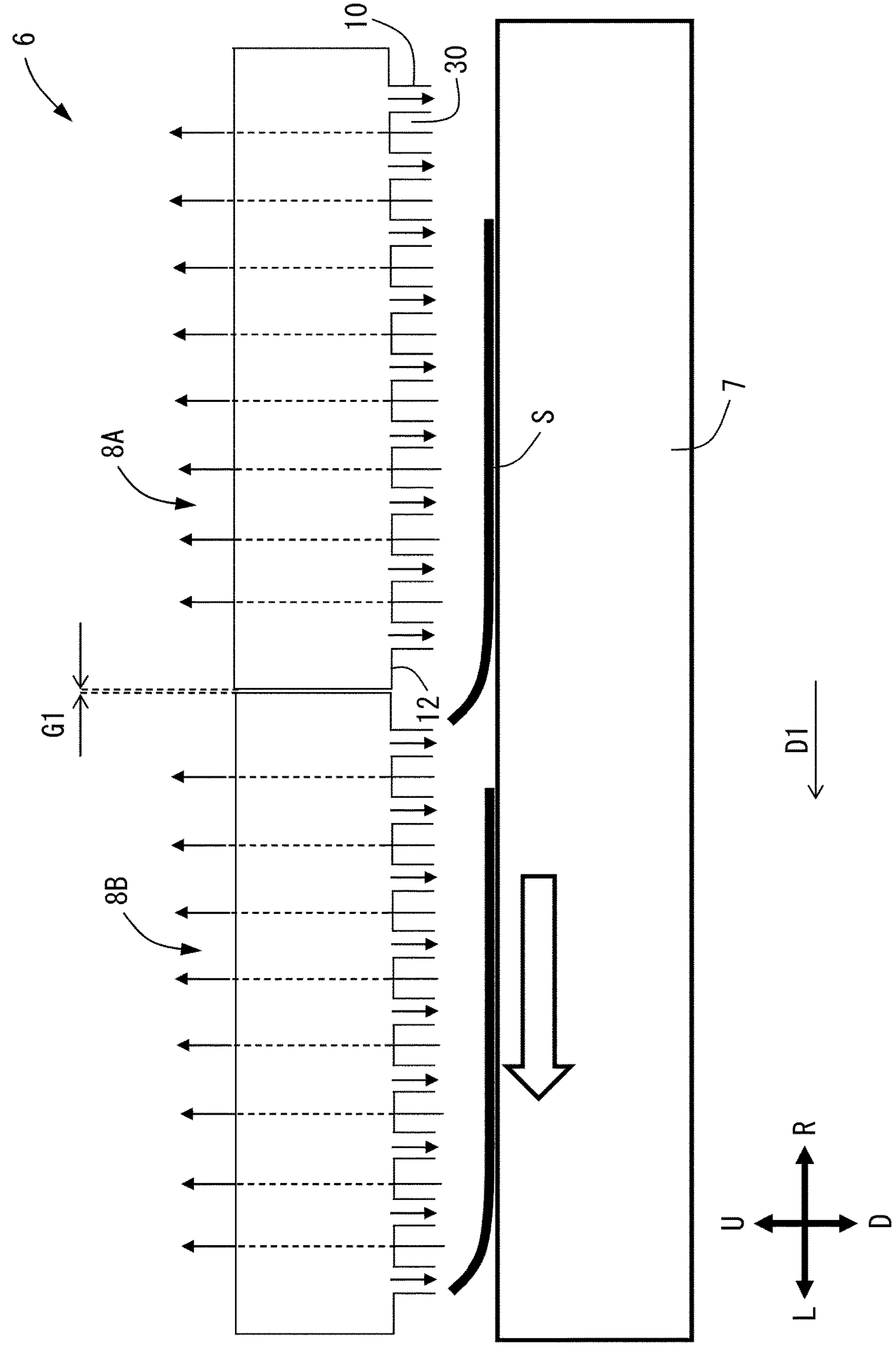
FIG. 5 is a cross-sectional view of the outline configuration illustrating a state in which the drying portion of the warm air blowing unit according to the Embodiment is viewed from a front.
Figure 6:
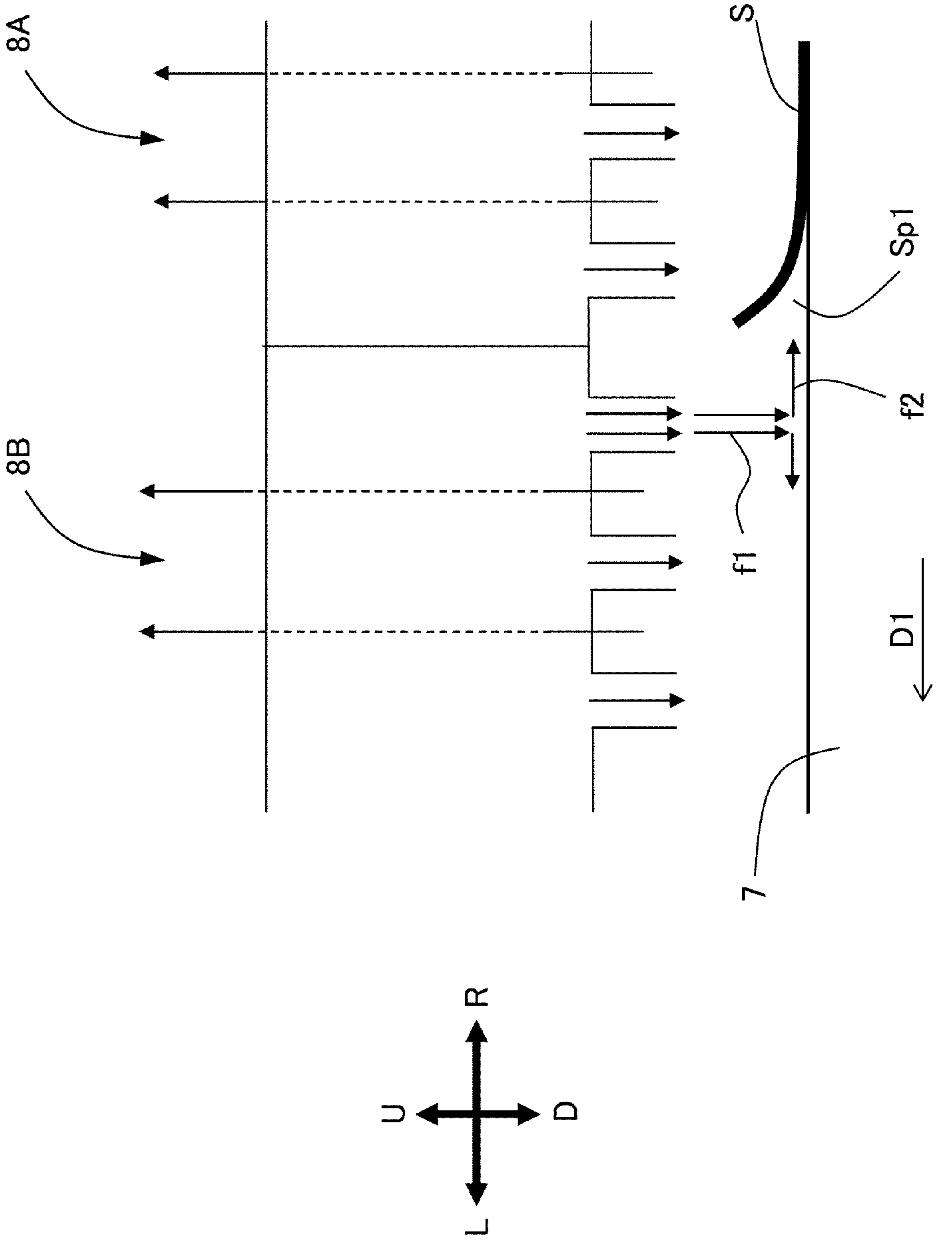
FIG. 6 is a cross-sectional view of the outline configuration illustrating a blowing nozzle of the warm air blowing unit and a sheet according to the Embodiment.

Here, a problem which the present Embodiment intends to solve will be described using FIG. 5 and FIG. 6. In FIG. 5, a detailed view of the drying portion 6 as viewed from the front of the main assembly is shown. FIG. 6 is an enlarged view of the leading end portion of the sheet S of FIG. 5. As shown in FIG. 5 and FIG. 6, the air blown from the warm air blowing unit 8, in a case in which the sheet S is not present below the warm air blowing unit 8, is blown in a direction f1 (see FIG. 6) toward the drying belt 7 opposite below the warm air blowing unit 8. The blown air collides with the belt surface of the drying belt 7 and change a direction of the flow of the air in a direction f2 (see FIG. 6) parallel to the belt surface. Here, a case in which curl is occurring at the leading end of the sheet S toward an upper direction U is considered. When the curl is occurring in the sheet S, a space Sp1 (see FIG. 6) is created between the drying belt 7 and the sheet S. The air flows in the direction f2 toward the space Sp1, causing a curled portion of the sheet S to roll up, which may prevent the sheet S from being conveyed properly. This is the problem which the present Embodiment intends to solve.

Characteristic Configuration of the Present Embodiment

Figure 7:
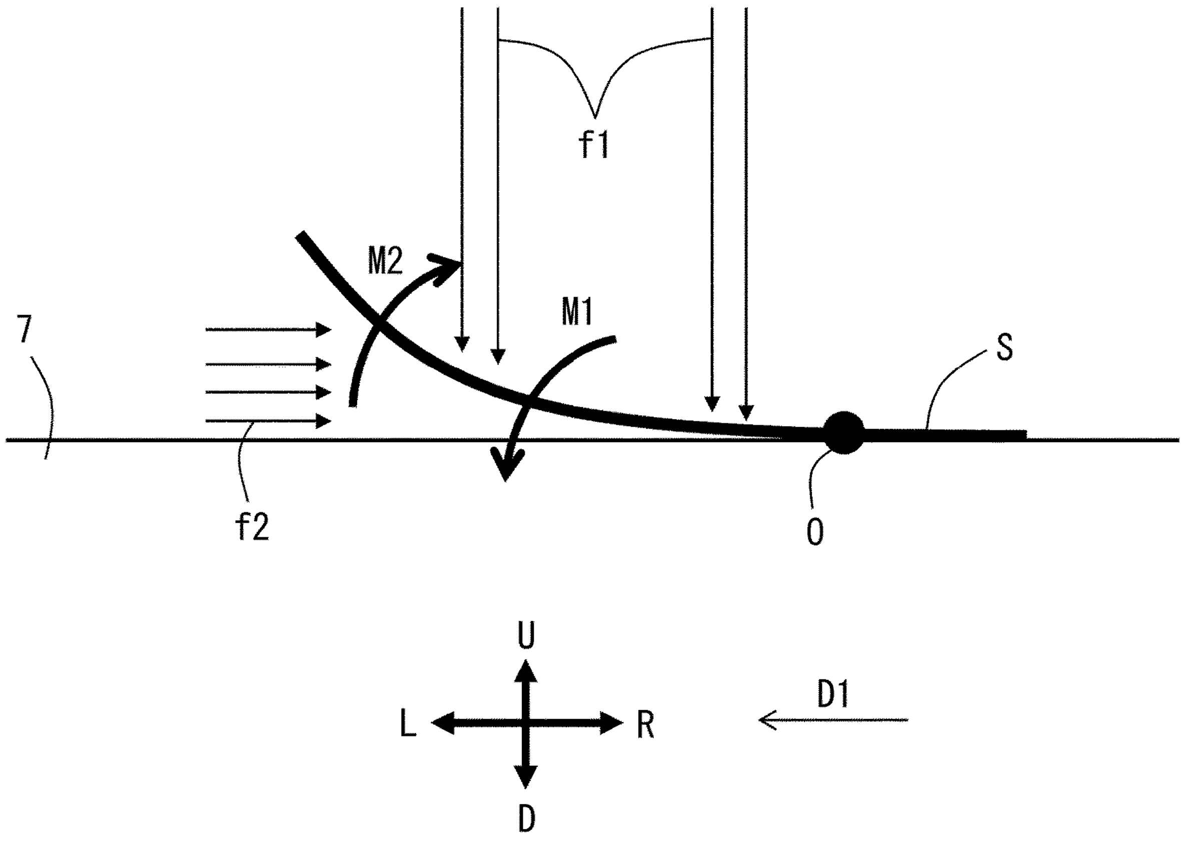
FIG. 7 is an enlarged cross-sectional view of the outline configuration illustrating the blowing nozzle of the warm air blowing unit and the sheet according to the Embodiment.

On the other hand, the flow of the air in the direction f1 in FIG. 6 blows from directly above the sheet S, pressing the sheet S against the belt surface of the drying belt 7 and preventing the sheet S from floating up. In order to describe details and effect of the configuration of the present Embodiment, effect of the air flowing in the direction f2 and the air flowing in the direction f1 on the sheet S and condition for the sheet S not to roll up will be described in detail using FIG. 7 and FIG. 8. FIG. 7 is what enlarges the curled portion of the sheet S, and FIG. 8 is a view of a simplified model of the sheet S.

Figure 8:
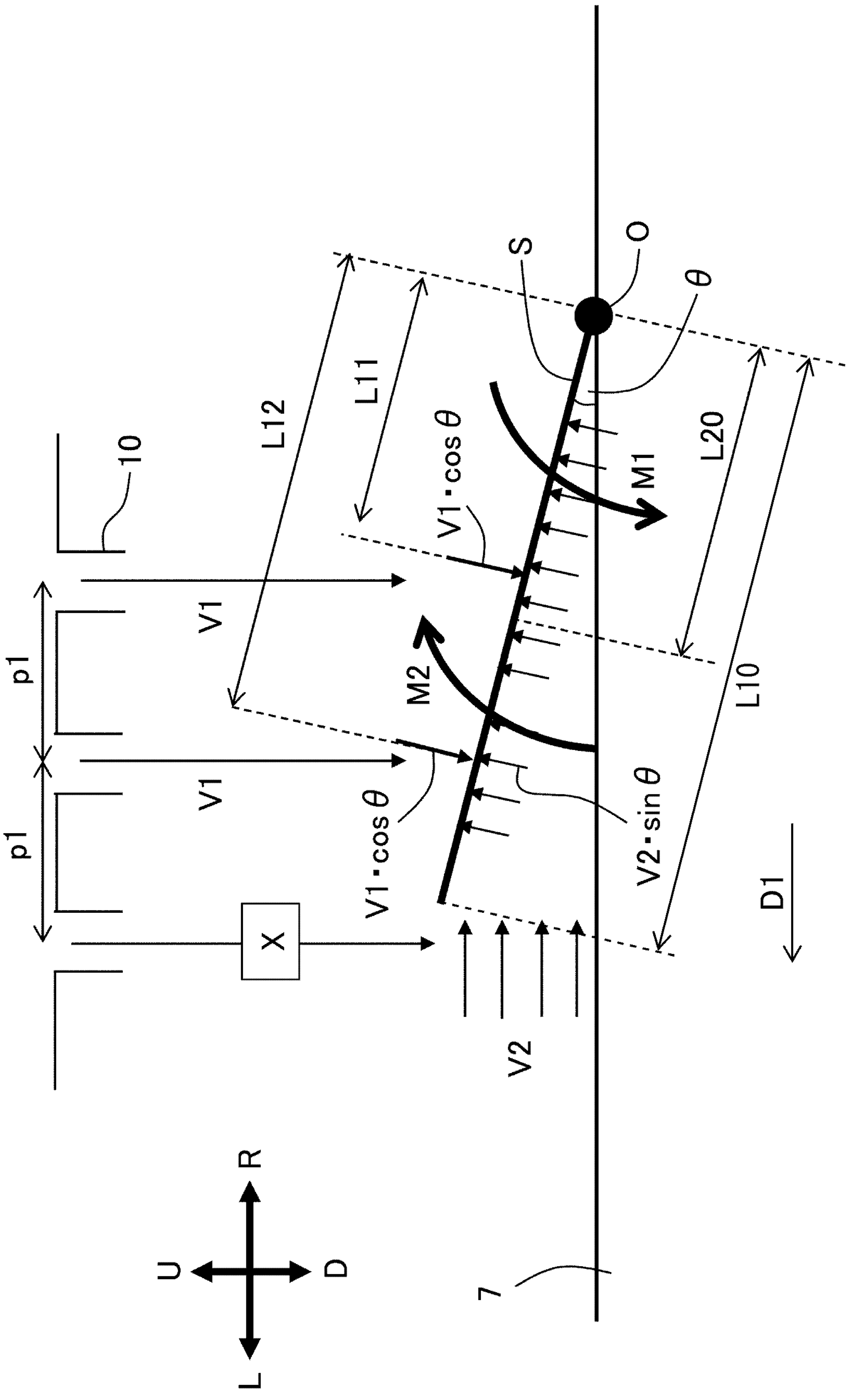
FIG. 8 is a further enlarged cross-sectional view of the outline configuration illustrating the blowing nozzle of the warm air blowing unit and the sheet according to the Embodiment.

As shown in FIG. 8, moment of force rolling up the sheet S by the air flowing in the direction f2 is defined as M2, and moment of force pressing down the sheet S by the air flowing in the direction f1 is defined as M1.

Then, condition for the sheet S not to roll up should be as Equation 1.

$$M2 < M1 \quad \text{(Equation 1)}$$

Here M2 and M1 will be described in detail using FIG. 8. Incidentally, in FIG. 8, it is assumed that the curled portion of the sheet S is a straight line sloped at an angle θ from the belt surface of the drying belt unit 5 with origin of the curl being O.

First, M2 will be described. M2 is expressed by a product of force F2, which is exerted on the sheet S by the air flowing in the direction f2, and L20 (a distance from O to a center of the curled portion of the sheet S), which is Equation 2.

$$M2 = F2 \times L20 \quad \text{(Equation 2)}$$

Here, when pressure of the air flowing in the direction f2 is defined as P2, and an area of the sheet S in the curled portion is defined as Ss, then F2 is expressed as Equation 3.

$$F2 = P2 \times Ss \quad \text{(Equation 3)}$$

Here, P2 is expressed as Equation 4.

$$P2 = 0.5 \times \rho \times (V2 * \sin\theta)^2 \times CD \quad \text{(Equation 4)}$$

ρ: Density of the air [N/m$^3$]=11.4

V2: Blown air velocity of the air flowing in the direction f2 [m/s]

CD: Air resistance coefficient

According to Equation 2 through Equation 4, it can be found that M2 is constant regardless of a position of the sheet S.

Next, M1 will be described. M1 is expressed by a product of force F1, which is exerted on the sheet S by the air flowing in the direction f1, and L11 and L12 (a distance between O and a position where the air in the direction f1 hits the sheet S), which is Equation 5.

$$M1 = F1 * L11 + F1 * L12 \quad \text{(Equation 5)}$$

Here, when pressure of the air flowing in the direction f1 is defined as P1 and an area of the sheet S hit by the air flowing in the direction f1 is defined as Sc, then F1 is expressed as Equation 6.

$$F1 = P1 * Sc \quad \text{(Equation 6)}$$

Here, P1 is expressed as Equation 7.

$$P1 = 0.5 \times \rho \times (V1 \times \cos\theta)^2 \times CD \quad \text{(Equation 7)}$$

ρ: Density of the air [N/m$^3$]=11.4

V1: Blown air velocity of the air flowing in the direction f1 [m/s]

CD: Air resistance coefficient

From Equation 5 through Equation 7, it can be seen that M1 is a value which changes as the position (L11, L12) where the air flowing in the direction f1 hits the sheet S change. M1 takes on a larger value when L11 and L12 are at their maximum, i.e., when the position where the air flowing in the direction f1 hits the sheet S get closer to the leading end of the sheet S. Here, in light of Equation 1, it can be seen that in order to solve the problem which the present Embodiment focuses on (i.e., to prevent the sheet S from being rolled up), it is important to make L11 and L12 large and to press the leading end of the sheet S as far as possible with the wind blowing in the direction f1.

L11 and L12 are values determined by positional relationship between the sheet S and the blowing nozzle 10. That is, when the sheet S is conveyed, L11 and L12 change chronologically, and M1 also changes chronologically, depending on the position of the sheet S during the conveyance. To ensure that the sheet S does not always roll up during the conveyance, it is necessary for Equation 1 always to be satisfied even if M1 changes chronologically.

Here, when M1 becomes the smallest is a case, as shown in FIG. 8, in which the air flowing in the direction f1 does not hit the leading end of the sheet S, and the blowing nozzle 10 is disposed just downstream of the leading end of the sheet (position X in FIG. 8). When the sheet S is in the position of FIG. 8, and a length of the curled portion is defined as L10, then L11 and L12 are expressed as in Equation 8. Incidentally, p1 is the first pitch of the blowing nozzles 10 in the sheet conveyance direction D1.

$$L11 = L10 - (2 \times p1)/\cos\theta \quad \text{(Equation 8)}$$
$$L12 = L10 - p1/\cos\theta$$

Thus, substituting these into Equation 5, M1 is expressed in terms of the first pitch p1 as in Equation 9.

$$\begin{aligned} M1 &= F1 \times (L10 - (2 \times p1)/\cos\theta) + F1 \times (L10 - p1/\cos\theta) \\ &= F1 \times (2 \times L10 - 3 \times p1/\cos\theta) \end{aligned} \quad \text{(Equation 9)}$$

As described above, in order for Equation 1 to be satisfied by increasing M1, it is important to reduce the first pitch p1 of the blowing nozzles 10.

In the present Embodiment, an experiment was conducted to determine whether or not the floating up of the sheet S occurs when the sheet S is disposed as shown in FIG. 8 and the air is blown from the warm air blowing unit 8. Experimental conditions are as follows: blown air velocity v: 33 m/s, sheet: GFC-081, curled height: 10 mm (θ=20°). Results thereof are shown in FIG. 9.

As shown in FIG. 9, no floating up of the sheet S occurs when the first pitch p1 is equal to or less than 10 mm, and the floating up occurs when the first pitch p1 is more than 10 mm. That is, it is preferable that the first pitch p1 be equal to or less than 10 mm. The smaller the first pitch p1, the better the sheet S is against the floating up.

On the other hand, when the first pitch p1 is made smaller, a number of the blowing nozzles 10 on the blowing surface 12 increases, resulting in a larger total opening area and occurrence of a problem in which the blown air velocity decreases when air volume is the same. If the blown air velocity is reduced, since the force to press the sheet S is reduced, the conveyance of the sheet S becomes unstable, and there is a possibility that drying capacity is decreased. Furthermore, as the force to press the sheet S is reduced, effect of self-propelled wind hitting air downstream in the conveyance direction as the sheet S is conveyed becomes relatively larger. Based on these considerations, it is preferable that a lower limit of the first pitch p1 be 5 mm, about a half of the upper limit of 10 mm, and more preferable 7 mm if the floating up is not considered. Therefore, in the present Embodiment, the first pitch p1 is equal to or more than 5 mm and equal to or less than 10 mm. However, these specific values are not limited to the above values since these values vary depending on various conditions, such as the conveying speed and material of the sheet S, and the blown air velocity blown from the warm air blowing unit 8.

[Disposition of the Warm Air Blowing Holes of the Adjacent Blowing Units]

Here, in the present Embodiment, as shown in FIG. 5, in consideration of assembly of the device and production of components, the warm air blowing unit 8 of the drying portion 6 is not one, but is constituted by a plurality of the warm air blowing units 8 (e.g., 8A and 8B) connected side by side in the sheet conveyance direction D1. In this case, a certain amount of space G1 must be left between the adjacent warm air blowing units 8A and 8B for component installation. Therefore, there is a possibility that only between adjacent warm air blowing units 8A and 8B, the pitch becomes larger than the first pitch p1 in other locations. If the pitch of the blowing nozzles 10 between the warm air blowing units 8A and 8B is increased, the suppressing effect for the floating up of the leading end of the sheet S is reduced in that area, and then there is a possibility that a jam becomes more likely to occur.

Therefore, in the present Embodiment, the blowing surface 12 is configured as shown in FIG. 10 in the connected warm air blowing units 8A and 8B. FIG. 10 is a view of the warm air blowing units 8A and 8B connected to each other as viewed from below. The warm air blowing units 8A and 8B include a first blowing duct 14A and a second blowing duct 14B, respectively. The blowing duct 14A is an example of a first blowing duct and includes a first blowing surface 12A, and the blowing duct 14B is an example of a second blowing duct and includes a second blowing surface 12B. As shown in FIG. 10, a boundary portion between the upstream warm air blowing unit 8A and the downstream warm air blowing unit 8B is not linear but a surface having irregularities. Incidentally, side surfaces of the blowing ducts 14 of the warm air blowing units 8A and 8B include similar irregularities. However, it is not limited to thereto, but the side surfaces of the blowing ducts 14 of the warm air blowing units 8A and 8B may be flat, and only the lower end portion of the duct constituting the first blowing surface 12A and the second blowing surface 12B may have such a shape of irregularities.

Here, the warm air blowing unit 8A is an example of a first blowing unit and includes a plurality of blowing nozzles 10A. The plurality of the blowing nozzles 10A are an example of a plurality of first blowout holes, and blow the air toward the drying belt 7 to press the sheet S onto the drying belt 7. That is, the plurality of the blowing nozzles 10A blow the air guided by the first blowing duct 14A toward the sheet S conveyed by the drying belt 7. The warm air blowing unit 8B is an example of a second blowing unit, disposed adjacent to and downstream of the warm air blowing unit 8A with respect to the sheet conveyance direction D1 by the drying belt 7, and includes a plurality of blowing nozzles 10B. The plurality of the blowing nozzles 10B are an example of a plurality of second blowout holes, which blow the air toward the drying belt 7 to press the sheet S onto the drying belt 7. That is, the plurality of blowing nozzles 10B blow the air guided by the second blowing duct 14B toward the sheet S conveyed by the drying belt 7.

Then, a pitch between any first hole 10*a* of the plurality of the blowing nozzles 10A and a second hole 10*b* positioned downstream of the first hole 10*a* in the sheet conveyance direction D1 and has the shortest distance from the first hole 10*a* with respect to the sheet conveyance direction D1 is defined as the first pitch p1. In addition, a pitch between a downstreammost hole 10Aa positioned downstreammost of the plurality of the blowing nozzles 10A and a upstreammost hole 10Ba positioned upstreammost of the plurality of the blowing nozzles 10B with respect to the sheet conveyance direction D1 is defined as a second pitch p2. In this case, it is configured that the second pitch p2 should be equal to or less than the first pitch p1 (equal to or less than the first pitch). In the present Embodiment, the second pitch p2 is set equal to the first pitch p1. However, the second pitch p2 does not necessarily have to be the same as the first pitch p1. The first pitch p1 and the second pitch p2, without distinction, are equal to or more than 5 mm and equal to or less than 10 mm, and preferably 7 mm. The first pitch p1 may be within ±40% of the second pitch. In the present Embodiment, the shortest distance between the first hole 10*a* and the second hole 10*b* in the sheet conveyance direction D1 is defined as the second pitch p2. In addition, an average length of the first pitch p1 of the plurality of the blowing nozzles 10A in the sheet conveyance direction D1 is equal to or more than the second pitch p2 (equal to or more than the pitch).

The warm air blowing unit 8A includes the first blowing surface 12A disposed opposite to the drying belt 7 and on which the plurality of the blowing nozzles 10A are formed. A downstream end portion of the first blowing surface 12A in the sheet conveyance direction D1 includes a first part 12A1 on which the downstreammost hole 10Aa is formed and a second part 12A2 positioned in an upstream side of the first part 12A1 in the sheet conveyance direction D1. The warm air blowing unit 8B includes the second blowing surface 12B disposed opposite to the drying belt 7 and on which the plurality of the blowing nozzles 10B are formed. An upstream end portion of the second blowing surface 12B in the sheet conveyance direction D1 includes a third part 12B3 on which the upstreammost hole 10Ba is formed and a fourth part 12B4 positioned in a downstream side of the third part 12B3 in the sheet conveyance direction D1.

By making the positional relationship between the warm air blowing units 8A and 8B be such a configuration, it becomes possible to prevent the pitch from becoming longer between the ducts due to the effect of the space G1. Specifically, it is possible for the upstreammost hole 10Ba of the downstream warm air blowing unit 8B to be disposed closer to the downstreammost hole 10Aa of the upstream warm air blowing unit 8A in the sheet conveyance direction D1.

In addition, with respect to the sheet conveyance direction D1, the first part 12A1 opposes the fourth part 12B4 and the second part 12A2 opposes the third part 12B3. And, as viewed from the sheet widthwise direction W crossing to the sheet conveyance direction D1, it is disposed so that at least a part of the first part 12A1 and at least a part of the third part 12B3 are overlapped.

Furthermore, the first parts 12A1 are provided more than one and the third parts 12B3 are provided more than one. The plurality of first parts 12A1 and the plurality of third parts 12B3 are alternatively disposed with respect to the sheet widthwise direction W.

In addition, in the present Embodiment, the plurality of the blowing nozzles 10A of the warm air blowing unit 8A are divided into a plurality of groups including a first group 10G1 and a second group 10G2. The first group 10G1 is a group including the blowing nozzles 10A disposed in a line along the sheet conveyance direction D1. The second group 10G2 is a group including the blowing nozzles 10 A disposed in the line along the sheet conveyance direction D1 at a position different from the first group 10G1 in the sheet widthwise direction W. The first group 10G1 and the second group 10G2 are disposed so that arrangement of the blowing nozzles 10 is not like vertexes of rectangles, but are disposed so as to be alternatively by the first group 10G1 and the second group 10G2 being offset from each other in the sheet conveyance direction D1. That is, as viewed in the sheet widthwise direction W, the blowing nozzles 10A of the first group 10G1 and the blowing nozzles 10A of the second group 10G2 are alternatively disposed with respect to the sheet conveyance direction D1. As viewed in the sheet widthwise direction W, the first pitch p1 is a pitch between any blowing nozzles 10Ab of the first group 10G1 and the blowing nozzles 10Ac of the second group 10G2 aligned in the sheet conveyance direction D1 with respect to the blowing nozzle 10Ab of the first group 10G1.

As described above, according to the drying module 3000 of the present Embodiment, it is configured that the second pitch p2, which is a pitch of the blowing nozzles 10 of the adjacent warm air blowing units 8A and 8B, is equal to or less than the first pitch p1. By this, it becomes possible to prevent the pitch from becoming longer, even though the pitch is a length between the warm air blowing units 8A and 8B, and to suppress the floating up of the sheet S while drying the sheet S by blowing the air.

Incidentally, in the present Embodiment, the pitches of the first blowing surface 12A are all equally spaced. However, it is not limited thereto, but the different space to an extent that the sheet S does not float up may be employed. Furthermore, the first pitch p1 refers to the pitch of the first blowing surface 12A, but may be calculated by averaging the pitches within the first blowing surface 12A.

In addition, in the present Embodiment, the first parts 12A1 are provided more than one and the third parts 12B3 are provided more than one. Therefore, since the sheet S can be pressed against the belt surface over a wide area in the sheet widthwise direction W, it becomes possible to suppress the floating up of the sheet S effectively.

Incidentally, in the Embodiment described above, the case in which the blowing nozzles 10A of the first group 10G1 and the blowing nozzles 10A of the second group 10G2 are alternatively disposed in the sheet conveyance direction D1 as viewed from the sheet widthwise direction W is described, however, this is not limited thereto. For example, all blowing nozzles 10 may be disposed in positions corresponding to vertexes of rectangles or disposed in positions corresponding to vertexes of regular hexagons.

In addition, in the Embodiment described above, the configuration of the image forming system for sheet-feeding printing is described as shown in FIG. 1. However, the image forming systems are not limited to the sheet-feeding printers, but the present invention can also be applied to continuous feeding printers. In the continuous feeding printers, the effect of the present Embodiment can be obtained at the most leading end portion of the sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-093118 filed on Jun. 6, 2023, which is hereby incorporated by reference herein in its entirety.

What is claimed is:

1. A drying device for blowing warm air on a sheet on which an image is formed by discharging ink and for drying the sheet, the drying device comprising:

a conveyance belt configured to convey the sheet;

a first blowing unit including (1) a plurality of first blowout holes configured to blow out air toward the sheet conveyed by the conveyance belt and (2) a first duct configured to guide the air to the first blowout holes; and a second blowing unit disposed adjacent to and downstream of the first blowing unit with respect to a sheet conveyance direction, and including (1) a plurality of second blowout holes configured to blow out air toward the sheet conveyed by the conveyance belt and (2) a second duct configured to guide the air to the second blowout holes, wherein the plurality of first blowout holes includes a first hole, a second hole which is located downstream of the first hole in the sheet conveyance direction and of which a distance to the first hole with respect to the sheet conveyance direction is shortest, and a third hole which is located downstreammost of the plurality of first blowout holes in the sheet conveyance direction, wherein a pitch between the first hole and the second hole with respect to the sheet conveyance direction is a first pitch, wherein the plurality of second blowout holes includes a fourth hole which is located upstreammost of the plurality of second blowout holes in the sheet conveyance direction, wherein a pitch between the third hole and the fourth hole with respect to the sheet conveyance direction is a second pitch, and wherein the second pitch is equal to or less than the first pitch.

2. A drying device according to claim 1, wherein the first blowing unit includes a first blowing surface disposed opposite to the conveyance belt and on which the plurality of first blowout holes are formed, wherein the second blowing unit includes a second blowing surface disposed opposite to the conveyance belt and on which the plurality of second blowout holes are formed, wherein a downstream end portion of the first blowing surface in the sheet conveyance direction includes at least one first part on which the third hole is formed and a second part positioned in an upstream side of the first part in the sheet conveyance direction, wherein an upstream end portion of the second blowing surface in the sheet conveyance direction includes at least one third part on which the fourth hole is formed and a fourth part positioned at a downstream side of the third part in the sheet conveyance direction, wherein with respect to the sheet conveyance direction, the first part opposes the fourth part and the second part opposes the third part, and wherein as viewed in a sheet widthwise direction crossing to the sheet conveyance direction, at least a part of the first part and at least a part of a third part are overlapped with each other.

3. A drying device according to claim 2, wherein the at least one first part comprises a plurality of first parts, wherein the at least one third part comprises a plurality of third parts, and wherein the plurality of the first parts and the plurality of the third parts are alternatively disposed with respect to the sheet widthwise direction.

4. A drying device according to claim 1, wherein the plurality of first blowout holes of the first blowing unit is provided with (1) a first group including first blowout holes disposed in a line along the sheet conveyance direction and (2) a second group including first blowout holes disposed in a line along the sheet conveyance direction at a position different from the first group in a sheet widthwise direction crossing to the sheet conveyance direction, wherein as viewed in the sheet widthwise direction, the first blowout holes of the first group and the first blowout holes of the second group are alternatively disposed with respect to the sheet conveyance direction, and wherein as viewed in the sheet widthwise direction, the first pitch is a pitch between the first blowout holes of the first group and the first blowout holes of the second group aligned in the sheet conveyance direction with respect to the first blowout holes of the first group.

5. A drying device according to claim 1, wherein the first pitch is equal to or more than 5 mm and equal to or less than 10 mm.

6. A drying device according to claim 1, wherein the first pitch is a length between a line passing through the first hole and perpendicular to the sheet conveyance direction and a line passing through the second hole and perpendicular to the sheet conveyance direction, and wherein the second pitch is a length between a line passing through the third hole and perpendicular to the sheet conveyance direction and a line passing through the fourth hole and perpendicular to the sheet conveyance direction.

7. A drying device according to claim 1, wherein the fourth hole and each second hole other than the fourth hole among the plurality of second blowout holes are disposed so as not to be overlapped with each other in the sheet conveyance direction.

8. A drying device for blowing a warm air on a sheet on which an image is formed by discharging ink and for drying the sheet, the drying device comprising:

a conveyance belt configured to convey the sheet;

a first blowing unit including (1) a plurality of first blowout holes configured to blow out air toward the sheet conveyed by the conveyance belt and (2) a first duct configured to guide the air to the first blowout holes; and a second blowing unit disposed adjacent to and downstream of the first blowing unit with respect to a sheet conveyance direction, and including (1) a plurality of second blowout holes configured to blow out air toward the sheet conveyed by the conveyance belt and (2) a second duct configured to guide the air to the second blowout holes, wherein the plurality of second blowout holes include (1) a plurality of first holes provided so as to form a first row extending in a predetermined direction along the sheet conveyance direction, (2) a plurality of second holes provided so as to form a second row, which is adjacent to the first row in the widthwise direction perpendicular to the sheet conveyance direction and which extends in the predetermined direction, and (3) a third hole disposed between the first row and the second row and located upstreammost in the sheet conveyance direction, wherein the plurality of first blowout holes include (1) a plurality of fourth holes provided so as to form a third row, which is located between the first row and the second row and is provided and which extends in the predetermined direction, (2) a plurality of fifth holes provided so as to form a fourth row, which is adjacent to the third row in the widthwise direction perpendicular to the sheet conveyance direction and which extends in the predetermined direction, and (3) a plurality of sixth holes provided so as to form a fifth row, which is adjacent to the third row on the side opposite to the fourth row and which extends in the predetermined direction, and wherein the third hole is located between the fourth row and the fifth row.

9. A drying device according to claim 8, wherein the fourth row is located between the first row and the third row, and wherein the second row is located between the fifth row and the third row.

10. A drying device according to claim 8, wherein the first blowing unit is provided with a first surface disposed so as to face the conveyance belt and in which the plurality of first blowout holes are formed, and provided with (1) a first portion of which a downstream end of the first surface in the conveyance direction is at a first position and (2) a second portion of which a downstream end of the first surface in the conveyance direction is at a second position located upstream of the first position, wherein the third row is formed at the same position as the second portion in the sheet widthwise direction perpendicular to the sheet conveyance direction, wherein the fourth row is formed at the same position as the first portion in the sheet widthwise direction perpendicular to the sheet conveyance direction, wherein the second blowing unit is provided with a second surface disposed so as to face the conveyance belt and in which the plurality of second blowout holes are formed, and provided with (1) a third portion of which an upstream end of the second surface in the conveyance direction is at a third position and (2) a fourth portion of which an upstream end of the second surface in the conveyance direction is at a fourth position located downstream of the third position, and wherein the third hole is formed at the same position as the second portion in the sheet widthwise direction perpendicular to the sheet conveyance direction.

11. A drying device according to claim 10, wherein, of the plurality of fourth holes, a hole disposed downstreammost in the sheet conveyance direction is defined as an eighth hole, wherein, of the plurality of fifth holes, a hole disposed downstreammost in the sheet conveyance direction is defined as a ninth hole, wherein a pitch between the eighth hole and the ninth hole in the sheet conveyance direction is a first pitch, wherein a pitch between the eighth hole and the third hole in the sheet conveyance direction is a second pitch, and wherein the second pitch is equal to or smaller than the first pitch.

12. A drying device according to claim 10, wherein of the plurality of first holes, a hole located upstreammost in the sheet conveyance direction is positioned downstream of the third hole, and wherein of the plurality of second holes, a hole located upstreammost in the sheet conveyance direction is positioned downstream of the third hole.

13. A drying device according to claim 10, wherein as viewed in the widthwise direction perpendicular to the sheet conveyance direction, the first portion and the third portion are disposed at positions overlapping with each other.

14. A drying device for blowing warm air on a sheet on which an image is formed by discharging ink and for drying the sheet, the drying device comprising:

a conveyance belt configured to convey the sheet;

a first blowing unit including (1) a plurality of first blowout holes configured to blow out air toward the sheet conveyed by the conveyance belt and (2) a first duct configured to guide the air to the first blowout holes; and a second blowing unit disposed adjacent to and downstream of the first blowing unit with respect to a sheet conveyance direction, and including (1) a plurality of second blowout holes configured to blow out air toward the sheet conveyed by the conveyance belt and (2) a second duct configured to guide the air to the second blowout holes, and wherein an average length of a pitch of the plurality of the first blowout holes in the sheet conveyance direction is equal to or more than a pitch between a downstreammost hole located in the downstreammost of the plurality of the first blowout holes and an upstreammost hole located in the upstreammost of the plurality of the second blowout holes with respect to the sheet conveyance direction.

15. A drying device for blowing a warm air on a sheet on which an image is formed by discharging ink and for drying the sheet, the drying device comprising:

a conveyance belt configured to convey the sheet;

a first blowing unit including (1) a plurality of first blowout holes configured to blow out air toward the sheet conveyed by the conveyance belt and (2) a first duct configured to guide the air to the first blowout holes; and a second blowing unit disposed adjacent to and downstream of the first blowing unit with respect to a sheet conveyance direction, and including (1) a plurality of second blowout holes configured to blow out air toward the sheet conveyed by the conveyance belt and (2) a second duct configured to guide the air to the second blowout holes, wherein the plurality of first blowout holes includes (1) a first hole, (2) a second hole which is located downstream of the first hole in the sheet conveyance direction and of which a distance to the first hole with respect to the sheet conveyance direction is shortest, and (3) a third hole which is located downstreammost of the plurality of first blowout holes in the sheet conveyance direction, wherein a pitch between the first hole and the second hole with respect to the sheet conveyance direction is a first pitch, wherein the plurality of second blowout holes includes a fourth hole which is located upstreammost of the plurality of second blowout holes in the sheet conveyance direction, wherein a pitch between the third hole and the fourth hole with respect to the sheet conveyance direction is a second pitch, and wherein the second pitch is within a range of ±40% of the first pitch.

* * * * *